(12) United States Patent
Trivelpiece et al.

(10) Patent No.: US 11,544,984 B2
(45) Date of Patent: Jan. 3, 2023

(54) SYSTEMS AND METHODS FOR LOCATION IDENTIFICATION AND TRACKING USING A CAMERA

(71) Applicant: Sensormatic Electronics, LLC, Boca Raton, FL (US)

(72) Inventors: Steve E. Trivelpiece, Rancho Santa Margarita, CA (US); David Gathright, Yorba Linda, CA (US); Steven Raynesford, Mission Viejo, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/388,640

(22) Filed: Jul. 29, 2021

(65) Prior Publication Data

US 2021/0358241 A1 Nov. 18, 2021

Related U.S. Application Data

(63) Continuation of application No. 15/234,254, filed on Aug. 11, 2016, now abandoned.

(Continued)

(51) Int. Cl.
*G07C 9/25* (2020.01)
*H04N 7/18* (2006.01)
(Continued)

(52) U.S. Cl.
CPC ............ *G07C 9/253* (2020.01); *G06T 7/70* (2017.01); *G07C 9/00174* (2013.01); *G07C 9/00309* (2013.01); *G07C 9/28* (2020.01);

*H04N 7/185* (2013.01); *G06V 20/00* (2022.01); *G07C 2009/00769* (2013.01); *G07C 2209/04* (2013.01)

(58) Field of Classification Search
None
See application file for complete search history.

(56) References Cited

U.S. PATENT DOCUMENTS 5,844,505 A * 12/1998 Van Ryzin ....... G08G 1/096872
348/148
7,321,305 B2 * 1/2008 Gollu ................... G06Q 10/087
705/28

(Continued)

*Primary Examiner* — Stefan Gadomski
(74) *Attorney, Agent, or Firm* — ArentFox Schiff LLP (57) ABSTRACT

Systems and methods for location identification and tracking of a person, object and/or vehicle. The methods involve: obtaining, by a computing system, a video of a surrounding environment which was captured by a portable camera coupled to the person, object or vehicle; comparing, by the computing system, first images of the video to pre-stored second images to identify geographic locations where the first images were captured by the portable camera; analyzing, by the computing system, the identified geographic locations to verify that the person, object or vehicle is (1) traveling along a correct path, (2) traveling towards a facility for which the person, object or vehicle has authorization to enter, or (3) traveling towards a zone or secured area internal or external to the facility for which the person, object or vehicle has authorization to enter; and transmitting a notification from the computing system indicating the results of the analyzing.

12 Claims, 3 Drawing Sheets

Related U.S. Application Data (60) Provisional application No. 62/204,138, filed on Aug. 12, 2015.

(51) Int. Cl.
*G07C 9/00* (2020.01)
*G07C 9/28* (2020.01)
*G06T 7/70* (2017.01)
*G06V 20/00* (2022.01)

(56) References Cited

U.S. PATENT DOCUMENTS

| | | | | |
|---|---|---|---|---|
| 7,791,489 | B2* | 9/2010 | Gelbman | G06K 17/0022 340/5.1 |
| 8,001,054 | B1* | 8/2011 | Peart | H04L 9/3236 705/64 |
| 8,009,013 | B1* | 8/2011 | Hirschfeld | G07C 9/28 340/5.82 |
| 8,121,350 | B2* | 2/2012 | Klefenz | G06T 7/13 348/148 |
| 8,131,118 | B1* | 3/2012 | Jing | G06V 20/20 701/426 |
| 8,437,954 | B1* | 5/2013 | Freeman | G01C 21/206 701/426 |
| 8,509,488 | B1* | 8/2013 | Enge | G01C 21/3623 701/55 |
| 8,556,173 | B1* | 10/2013 | Huebner | F41G 7/2253 235/375 |
| 8,624,725 | B1* | 1/2014 | MacGregor | H04W 12/06 342/450 |
| 8,743,051 | B1* | 6/2014 | Moy | H04N 7/141 345/156 |
| 9,465,129 | B1* | 10/2016 | Olsson | G01V 3/15 |
| 2006/0095540 | A1* | 5/2006 | Anderson | H04L 67/52 709/217 |
| 2006/0224647 | A1* | 10/2006 | Gutnik | G06F 7/582 708/250 |
| 2006/0244830 | A1* | 11/2006 | Davenport | G06T 7/73 348/148 |
| 2007/0005609 | A1* | 1/2007 | Breed | B60W 50/00 |
| 2007/0273764 | A1* | 11/2007 | Yamada | B60R 1/00 348/148 |
| 2008/0122581 | A1* | 5/2008 | Bae | G06K 7/0008 340/10.2 |
| 2008/0150786 | A1* | 6/2008 | Breed | B60W 30/16 342/53 |
| 2008/0215202 | A1* | 9/2008 | Breed | G01C 21/3694 701/472 |
| 2008/0262718 | A1* | 10/2008 | Farwell | G05D 1/0244 701/445 |
| 2008/0297354 | A1* | 12/2008 | Foley | H04L 9/3271 340/572.4 |
| 2009/0096574 | A1* | 4/2009 | Oberle | H04L 9/3226 340/5.8 |
| 2009/0160610 | A1* | 6/2009 | Doddamane | G06F 7/588 708/250 |
| 2009/0189981 | A1* | 7/2009 | Siann | H04N 7/185 348/143 |
| 2009/0310851 | A1* | 12/2009 | Areas | G06T 7/55 382/154 |
| 2009/0315686 | A1* | 12/2009 | Oberle | G06F 21/35 713/193 |
| 2010/0001843 | A1* | 1/2010 | Bae | G06K 7/0008 340/10.2 |
| 2010/0092093 | A1* | 4/2010 | Akatsuka | G06T 7/30 382/218 |
| 2010/0171642 | A1* | 7/2010 | Hassan | B60C 23/0479 340/992 |
| 2010/0179691 | A1* | 7/2010 | Gal | H04N 5/23216 700/259 |
| 2010/0312466 | A1* | 12/2010 | Katzer | G08G 1/096827 701/533 |
| 2011/0037712 | A1* | 2/2011 | Kim | G06F 3/0488 345/173 |
| 2011/0261176 | A1* | 10/2011 | Monaghan, Sr. | H04N 7/183 348/61 |
| 2011/0285842 | A1* | 11/2011 | Davenport | B61L 27/40 348/116 |
| 2012/0158297 | A1* | 6/2012 | Kim | H04W 4/80 701/516 |
| 2013/0117078 | A1* | 5/2013 | Weik, III | G06Q 10/00 705/13 |
| 2013/0157682 | A1* | 6/2013 | Ling | H04W 4/02 455/456.1 |
| 2013/0214899 | A1* | 8/2013 | Herscovitch | G05B 1/01 340/5.6 |
| 2013/0226365 | A1* | 8/2013 | Brozovich | G06Q 10/047 701/1 |
| 2013/0332071 | A1* | 12/2013 | Kumakawa | G01C 21/00 701/400 |
| 2014/0072178 | A1* | 3/2014 | Carbonell | G08G 1/0175 382/105 |
| 2014/0136701 | A1* | 5/2014 | Billau | H04N 21/21805 709/225 |
| 2014/0240088 | A1* | 8/2014 | Robinette | G08B 21/0219 340/5.61 |
| 2014/0240350 | A1* | 8/2014 | Chen | G01C 21/206 345/633 |
| 2014/0247279 | A1* | 9/2014 | Nicholas | G06T 19/006 345/633 |
| 2014/0247280 | A1* | 9/2014 | Nicholas | G06F 3/011 345/633 |
| 2015/0119076 | A1* | 4/2015 | Cohen | G01S 5/0252 455/456.1 |
| 2015/0269734 | A1* | 9/2015 | Lee | G01C 21/3602 382/103 |
| 2015/0369615 | A1* | 12/2015 | Dzyuba | G01C 21/32 701/408 |
| 2016/0021512 | A1* | 1/2016 | Krallman | G06Q 30/0261 455/456.3 |
| 2016/0146615 | A1* | 5/2016 | Abhishek | H04W 4/44 701/519 |
| 2016/0165620 | A1* | 6/2016 | Dagen | H04W 72/10 709/219 |
| 2016/0182850 | A1* | 6/2016 | Thompson | H04L 65/61 348/158 |
| 2016/0223351 | A1* | 8/2016 | Sasse | G01C 21/3461 |
| 2016/0253907 | A1* | 9/2016 | Taveira | G08G 5/006 701/3 |
| 2016/0343156 | A1* | 11/2016 | Yoshizawa | G06F 3/0346 |
| 2017/0003135 | A1* | 1/2017 | Feltham | G01S 19/39 |
| 2017/0046580 | A1* | 2/2017 | Lu | G06T 7/70 |
| 2017/0200293 | A1* | 7/2017 | Solem | H04N 7/185 |
| 2017/0217027 | A1* | 8/2017 | Boucard | B25J 19/023 |
| 2017/0229025 | A1* | 8/2017 | Klinger | H01Q 3/26 |
| 2017/0270565 | A1* | 9/2017 | Filatoff | H04W 4/029 |
| 2018/0020333 | A1* | 1/2018 | Gillen | H04W 4/024 |
| 2018/0025632 | A1* | 1/2018 | Breed | G09B 29/106 701/93 |

* cited by examiner

SYSTEMS AND METHODS FOR LOCATION IDENTIFICATION AND TRACKING USING A CAMERA

CROSS-REFERENCE TO RELATED APPLICATIONS

The present application is a Continuation of pending U.S. patent application Ser. No. 15/234,254 filed Aug. 11, 2016, which claims the benefit of U.S. Provisional Patent Application No. 62/204,138 filed on Aug. 12, 2015. The contents of each related application are hereby incorporated by reference in their entirety.

FIELD OF THE INVENTION

This document relates generally to systems and methods for location identification and tracking. More particularly, this document relates to systems and methods for location identification and tracking using a camera.

BACKGROUND

There are numerous systems used for location tracking. These systems include Global Positioning Systems ("GPSs"), Radio Frequency ("RF") based indoor positioning systems, fixed camera systems, and mobile camera systems. The GPSs require an external system with additional requirements that cannot always be met (e.g., visibility of satellites). GPSs do not work indoors, do not provide direction, and are limited to outside locations under specific circumstances. The RF based indoor positioning systems require installed infrastructure with specific vendor technology. The fixed camera systems require an extensive system of installed infrastructure with specific vendor technology. The fixed camera systems have limited ability to indicate an individual's facing direction and path. The mobile camera systems simply record the camera's perspective and do not provide locational information.

The tracking of objects through a space is a common need in areas (such as security, traffic management and advertising) for the purposes of path verification, path optimization, security monitoring, etc. Object tracking has also traditionally been solved using static video cameras or attached video cameras.

Human security personnel routinely monitor facilities by walking, driving or otherwise monitoring a patrol route. However, verification of the performance of those duties requires additional management personnel, easily circumvented auxiliary verification measures, or complex techniques to adequately certify the execution of security monitoring duties.

Even in the instances where the path can be verified, the procedure and environment cannot. The individual's perspective is lost using current methods, which fail to provide details about what was done, where it was done, and how it was done.

Other techniques (such as GPS) require external systems with additional system requirements that cannot be met (e.g., visibility of satellites). Although such technologies may record a path, they cannot provide the perspective of the individual. Recorded video surveillance at a location and recorded perspective video from a body-mounted camera require personnel to view and potentially detect irregularities in procedure or environment, but cannot automatically demonstrate that correct procedures were followed nor immediately detect variations in procedure or environment.

SUMMARY

The present disclosure concerns implementing systems and methods for location identification and tracking of a person, object and/or vehicle. The methods comprise: obtaining, by a computing system, a video of a surrounding environment which was captured by a portable camera disposed on, coupled to and/or attached to the person, object or vehicle; comparing, by the computing system, first images of the video to pre-stored second images to identify geographic locations where the first images were captured by the portable camera; analyzing, by the computing system, the identified geographic locations to verify that the person, object or vehicle is (1) traveling along a correct path, (2) traveling towards a facility for which the person, object or vehicle has authorization to enter, (3) traveling towards a zone or secured area internal or external to the facility for which the person, object or vehicle has authorization to enter, or (4) located within or in proximity to the facility, zone or secured area for which the person, object or vehicle has authorization to enter; and transmitting a notification from the computing system indicating the results of the analyzing. The computing system may comprise at least one of the portable camera and a computing device remote from the portable camera. The computing system may also analyze the determined geographic location to additionally or alternatively determine: if the correct path is being traveled or was followed; and/or if the correct path is being traveled or was followed in a prescribed timely manner.

In some scenarios, the person, object or vehicle is allowed to enter the facility, zone or secured area when it is verified that the person, object or vehicle has authorization to enter the same. For example, a lock may be commanded to unlock so as to allow entry into the facility, zone or secured area. A unique identifier for the portable camera may be used as an electronic key for unlocking the lock. Security personnel may also be notified that the person, object or vehicle is authorized to enter the facility, zone or secured area.

Security personnel may additionally or alternatively be notified when it is not verified that the person, object or vehicle has authorization to enter the facility, zone or secured area. Measures may be taken to prevent the person, object or vehicle from entering the facility, zone or secured area when it is not verified that the person, object or vehicle has authorization to enter the same. The measures can comprise locking a lock. The unique identifier of the portable camera may be used as an electronic key for locking the lock. The unique identifier of the portable camera may also be used to: determine an access or clearance level of the person, object or vehicle; facilitate authentication of the person, object or vehicle on which the portable camera is disposed; and/or facilitate keyless access control into or out of the facility or secured area.

In those or other scenarios, the identified geographic locations are used to generate a path of travel of the person, object or vehicle through the surrounding environment. Global Positioning System ("GPS") data, inertial navigation data, beacon data and/or sensor data may be used in conjunction with the video to identify the geographic locations, to verify that the identified geographic locations are correct, to detect a path of travel, or to verify that the path of travel is correct. Additionally or alternatively, the portable camera may be used to capture an image of a mirror reflection of the person, object or vehicle to facilitate access control.

DESCRIPTION OF THE DRAWINGS

The present solution will be described with reference to the following drawing figures, in which like numerals represent like items throughout the figures.

DETAILED DESCRIPTION

It will be readily understood that the components of the present solution as generally described herein and illustrated in the appended figures could be arranged and designed in a wide variety of different configurations. Thus, the following more detailed description of the present solution, as represented in the figures, is not intended to limit the scope of the present disclosure, but is merely representative of various implementations of the present solution. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns implementing systems and methods for location identification and tracking using a camera and/or other environment sensing/recording devices (e.g., Light Detection And Ranging ("LIDAR") devices, plenoptic cameras, and/or structured light sensors). Each of the listed devices are well known in the art, and therefore will not be described in detail herein. Any known or to be known camera and/or environment sensing/recording device can be used herein without limitation. The systems and methods can be employed in various applications. For example, the systems and methods can be used for (1) access control into buildings/areas based on a person's security clearance level, (2) determining whether an employee performed his(her) required tasks (e.g., completed an assignment, went to the correct place(s), followed correct procedures, travelled the correct path through a facility, etc.), and/or (3) determining where a person is currently located within a facility. Data captured by the camera and/or environment sensing/recording device (e.g., video and/or images captured by the camera) can be used for verification, legal issue resolution, and/or future security review to determine who was present within the building/area at any given time.

Notably, the present solution is discussed herein primarily in relation to camera and/or video capture scenarios for ease of explanation. The present solution is not limited in this regard as evident from the immediately preceding two (2) paragraphs.

As known in the art, video capture is the process of converting an analog video signal (such as that produced by a camera) to digital video. The resulting digital data are computer files referred to herein as a digital video stream, a video stream, a captured video, and/or a video. The video may be stored in a compressed or uncompressed format. Methods for data compression are well known in the art. Any known or to be known data compression technique can be used herein without limitation.

The methods generally involve: recording images by the camera to create visual, locational fingerprints; identifying subsequent visits to known locations using images captured by the camera and a plurality of known location images which were pre-stored in a data store; analyzing differences from expected images; verifying paths using the visual, locational fingerprints and the known location images; identifying waypoints using the visual, locational fingerprints; logging position with a coordinate system; providing location and direction; optionally augmenting the position with the addition of GPS data, inertial navigation data, beacon information, or other sensor data (e.g., beam break sensor data); optionally augmenting tracking using sensor data; and/or providing additional spatial information using a three dimensional ("3D") camera.

The 3D camera can comprise a portable standard camera mounted on any mobile object, person or vehicle. The camera is operative to work in any environment and to provide facing direction. The visual, locational fingerprints can be previously stored, auto-learned or result from post processing of a route. Real-time processing could be added to provide immediate feedback for a self-contained system.

Notably, the camera based technique described herein does not require significant data storage, additional infrastructure for operability, or external systems for operability. By adding a 3D camera, images can be digitally rotated and distances can be determined between a person and an object of interest. The camera also allows automated detection of milestones or achievement of waypoints for fulfillment of procedures.

The camera based technique(s) described herein overcome(s) certain limitations of conventional techniques by providing location tracking, environment monitoring, individual perspective, and automatic verification of route and procedures. Additionally, the camera based technique(s) described herein can be used to provide access control, security zone control, visual evidence of security and individual involvement, detection of unexpected or unauthorized items in an environment, and identity verification. Furthermore, the camera based technique(s) described herein provide(s) solutions that are self-contained, use standard equipment, and do not require existing infrastructure.

Figure 1:
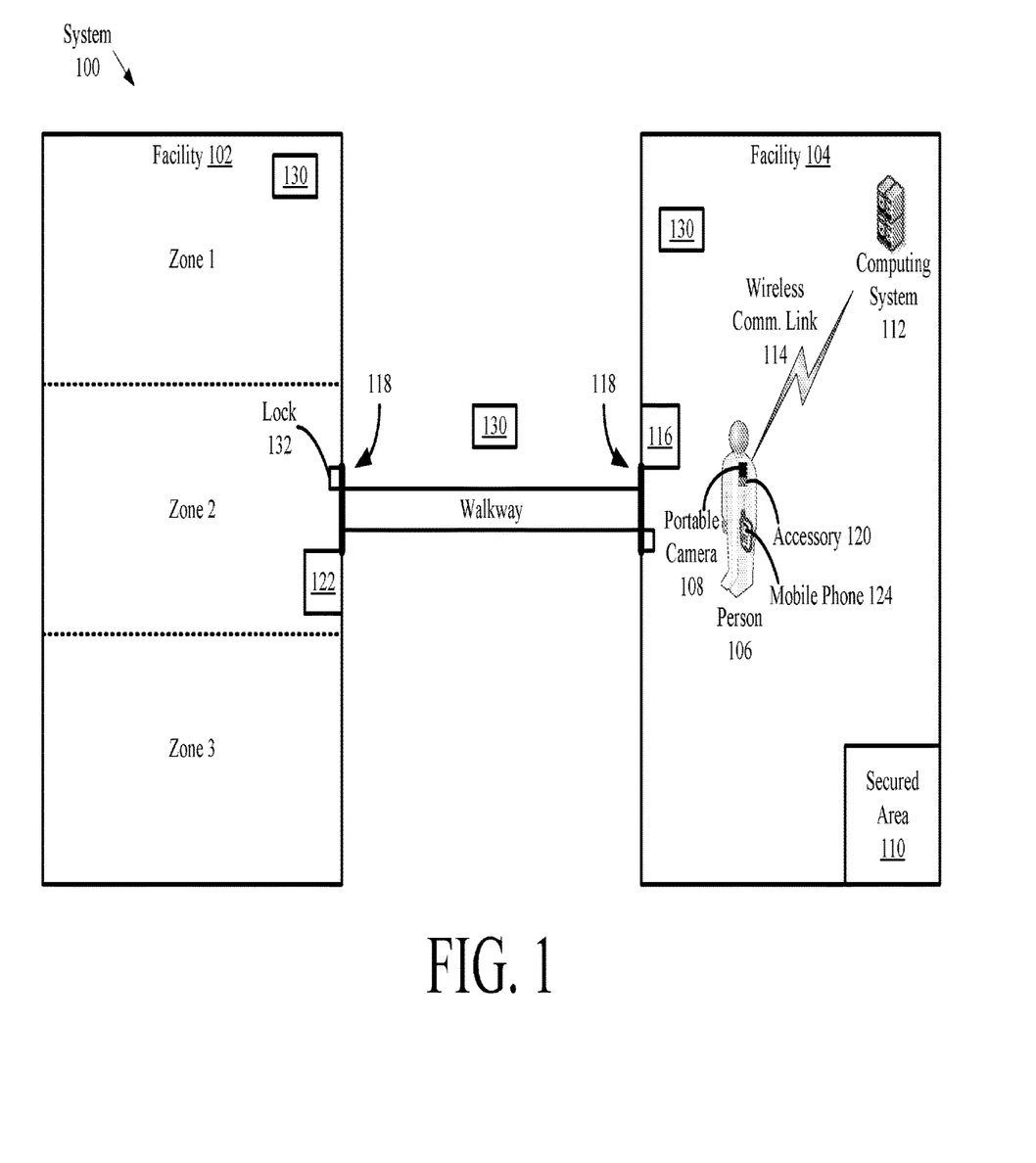
FIG. 1 is a schematic illustration of an exemplary system.

Referring now to FIG. 1, there is provided an exemplary system 100 configured for location identification and tracking of persons, object and/or vehicles using a portable camera 108. The portable camera 108 is attached to a person 106 (or alternatively to an object or vehicle). Portable cameras are well known in the art, and therefore will not be described herein. The portable camera 108 can comprise any known or to be known camera.

In some scenarios, the portable camera 108 is a 3D camera capable of generating 3D measurements of a space. For example, the portable camera 108 is an LG 360 CAM spherical camera having part number LGR105.AUSTATS available from LG Electronics Inc. of South Korea, a Theta S model camera available from Ricoh Company, Ltd. of Japan, or a GoPro action camera available from GoPro, Inc. of San Mateo, Calif. The 3D measurements can be used to verify a person's location and/or position within a space. The present solution is not limited to the particulars of these scenarios. As noted above, the portable device 108 can additionally or alternatively comprises a LIDAR device, a structured light system or other wide-field camera system.

In those or other scenarios, the portable camera 108 may have additional circuitry added thereto as an accessory 120. The additional circuitry can include, but is not limited to, a GPS circuit, an inertial navigation circuit, a beacon reader circuit, a processing unit and/or a data store. Each of the listed electronic circuits/devices is well known in the art, and therefore will not be described herein. Any known or to be known GPS circuit, an inertial navigation circuit, a beacon reader circuit, a processing unit and/or a data store can be used herein without limitation. The accessory 120 can be coupled to the portable camera via any suitable coupling means, such as an adhesive or mechanical coupler (e.g., screws, clamps, Velcro, straps, etc.).

During operation, the portable camera 108 captures video of a surrounding environment as the person 106 travels to, from and/or through facilities 102, 104. As should be understood, the capturing is achieved (in some scenarios) by converting analog video signals generated by the camera into a digital format. The captured video may be processed and/or stored by the portable camera 108. Additionally or alternatively, the video is communicated from the portable camera 108 to a remote computing system 112 via a wireless communications link 114 for processing thereat. As should be understood, the video data (which may be in an analog or digital form) is converted or transformed into a Radio Frequency (RF") form for transmission over the wireless communications link 114. The computing system 112 comprises at least one computing device and/or at least one data store (e.g., internal memory (e.g., a RAM, ROM, etc.) and/or external memory (e.g., a database)). An exemplary architecture for the computing system 112 is described below in relation to FIG. 3.

The present solution is not limited to wireless communications capabilities. The video may alternatively be communicated to the remote computing system 112 via a wired connection. For example, a plurality of kiosks is disposed at a facility. The camera downloads the video when it is inserted into a kiosk.

In all cases, the processing can involve: comparing video image content with pre-stored image content to identify locations internal to or external to the facilities 102, 104 (e.g., via pattern recognition or detection of known targets (symbols, signs, markers, statues, trees, doorways, or other landmarks, object or items) strategically placed internal/external to facilities 102, 104); using results of the comparison operations to determine at least one geographic location at which the image(s) was(were) captured and/or a path of travel for the person 108; and analyzing the identified geographic locations and/or determined path of travel to verify that the person 108 is traveling along a correct path, traveling towards a facility 102 for which the person has authorization to enter, traveling towards a zone 1-3 within a facility for which the person has authorization to enter, traveling towards a secured area 110 for which the person has authorization to enter, and/or is in or is about to enter a facility, secured area and/or zone for which the person has authorization to enter.

In some scenarios, the correct path is selected from a plurality of pre-defined paths stored in a data store. Alternatively or additionally, the correct path is dynamically generated or determined during operation of system 100. The correct path can be selected and/or dynamically generated/determined based on a current determined path of travel of the person, a predicted facility/secured area/zone to which the person is traveling, historical paths of travel associated with the person, a security/access level of the person, tasks assigned to the person, tasks previously performed by the person, tasks being performed by the person, and/or time of day/week/month/year. A determination as to whether or not the person is traveling along the correct path is made based on results of a comparison of the correct path of travel to the path of travel determined for the person based on the video data captured by the camera 108.

Notably, the video image content comparison can involve a percentage matching and/or a probability percentage that the processor knows correctly where the camera 108 is in 3D space. The percentage and/or probability percentage are selected based on a particular application, and may be set in a system as threshold values. For example, a match is determined to exist if greater than fifty percent (50%) of a video image's content (within the entire image or a select portion of the image) is the same as a pre-stored image's content (within the entire image or a select portion of the image). Once the amount of similar image content is determined, it is compared to a threshold value of fifty (50) to determine if a match does indeed exist between the two (2) images. A match is determined to exist when the amount of similar image content exceeds fifty (50). A match does not exist when the amount of similar image content is equal to or less than fifty (50).

In some scenarios, the comparison operations involve comparing images of the video to pre-stored images to identify matches. For example, as a result of the comparison operations, a percentage of a first video image's content is determined to match a first pre-stored image's content.

Location information is stored in a data store so as to be associated with the first pre-stored image. The location information specifies a known location of a landmark shown in the first pre-stored image. This known location is obtained and used for the camera's location at the time the first video image was captured thereby. The present solution is not limited to the particulars of this example. Other techniques for determined camera locations based on results of image processing can be used herein. Such other techniques can involve identifying specific visual elements and/or encoded information embedded within an image or series of images. Additionally, multiple iterations of this may be performed for matching image sets. Accordingly, a plurality of camera locations may be determined which can be analyzed and/or mapped to define a path of travel.

Based on results of the analysis, various measures can be taken for access control purposes. For example, if (a) the results indicate that the person 106 is traveling towards a particular facility 102, 104, zone 1, 2, 3, or secured area 110b and (b) the person 106 has the appropriate access/clearance level to enter the same, then access control operations are performed for allowing the person to enter the same. In some scenarios, the person's access/clearance level is determined by accessing a data store. A unique identifier assigned to the person (e.g., the camera's unique identifier or other sequence of symbols) is stored in the data store so as to be associated with a list of locations for which the person has the appropriate clearance/access level to enter. The access control operations can involve commanding a door lock of an access point 118 to unlock (thereby eliminating the need for a Common Access Card ("CAC") card) or notifying a security guard that the person 106 is authorized to access the facility, zone or secured area. The command and/or notification can be generated by and sent from the portable camera 108 and/or the computing system 112 to an electronic device 122 located at the access point 118 or in the security guards possession. Any known or to be known wired or wireless communication technique can be used without limitation for the stated purpose.

In contrast, if the results indicate that the person does not have the appropriate access/clearance level to enter the particular facility 102, 104, zone 1, 2, 3, or secured area 110b indicated by the determined path of travel, then a notification is provided to the person 106 (via camera 108, accessory 122 or other communication device (e.g., a mobile phone 124)) and/or to security personnel (e.g., via a computing device or communication device (e.g., a mobile phone)) indicating that the person 106 is attempting to access a facility, area and/or zone for which the person does not have the appropriate access/clearance level to enter. After which, the security personnel can take measures to prevent the person from entering a facility, zone and/or secured area for which (s)he does not have permission to access.

In some scenarios, the portable camera 108 has a unique identifier associated therewith. The unique identifier may be used (as mentioned above) to facilitate the identification of the person for which the video is being captured. Once the person has been identified, his(her) access/clearance level can be retrieved from a data store local to the portable camera 108 or remote from the portable camera 108. The required access/clearance level for the facilities 102, 104, zones 1-3, and secured area 110 can also be stored in the data store local to the camera 108 or remote from the camera (such as in the computing system 112). In this case, the access/clearance level retrieved for the person is compared to the required access/clearance level for a given facility, zone or secured area.

The unique identifier also facilitates authentication of the person in possession of the camera so as to prevent others from using that camera assigned to that person. Techniques for authenticating a person's identity are well known in the art. Any known or to be known authentication technique can be employed herein without limitation.

The unique identifier can further be used to facilitate keyless access control into a facility, secured area and/or zone. In this case, the camera's unique identifier is used at access or entry points (e.g., doors) 118 to allow authentication and access control. For example, the camera's unique identifier is used as the person's unique identifier for authentication purposes. In this case, the camera's unique identifier is compared to a plurality of stored identifiers to determine if a match exists. Alternatively or additionally, the camera's unique identifier is used as an electronic key for access control purposes such as unlocking a lock 132. The electronic key may be communicated from the camera 108 or other communication device 124 in the person's possession to the lock 132 via Radio Frequency Identification ("RFID") technology, Bluetooth technology or other Short Range Communication ("SRC") technology.

In those or other scenarios, GPS data, inertial navigation data, beacon data and/or other sensor data (e.g., accelerometer data, gyroscope data, etc.) is used in conjunction with the video data to detect the person's path of travel. The listed types of data are well known in the art, and therefore are not described in detail herein. Techniques for generating and/or acquiring such data are also well known in the art. Any known or to be known technique for generating and/or acquiring such data can be used herein without limitation.

In some scenarios, the GPS data, inertial navigation data, beacon data and/or other sensor data can be used to interpolate positions between known visual waypoints (e.g., to determine that the person turned left or right), i.e., to determine a position between two known fixed reference points in physical space (e.g., two landmarks). Methods for interpolating positions using waypoints are well known in the art. Any known or to be known interpolation methods can be used herein without limitation.

The GPS data, inertial navigation data, beacon data and/or other sensor data may alternatively or additionally be used to verify that the results of a video data analysis are correct, i.e., that the person's positon determined using the video data is correct. This verification can generally involve comparing location/position results of the video analysis with locations/positions specified by the GPS data, inertial navigation data, beacon data and/or other sensor data generate or acquired at the same time as the respective video image. The beacon data can be obtained via wireless communications between the camera 108 and beacons 130 (which are strategically placed in system 100 at indoor and/or outdoor locations). Beacons are well known in the art, and therefore will not be described herein. Any known or to be known beacon can be employed herein without limitation. For example, the beacons include iBeacons® available from Apple Inc. of Cupertino, Calif.

In yet other scenarios, facial recognition can be used at access points (e.g., doors) 118 to verify that the person possessing the camera 108 is the correct person. The facial recognition is achieved using mirrors 116 placed at the access points 118 so that the camera 108 can take pictures of the person's reflection shown in the mirrors. Facial recognition techniques are well known in the art, and therefore will not be described herein. Any known or to be known facial recognition technique can be used herein without limitation. The facial recognition technique can be implemented by camera 108 and/or computing system 112.

The present solution may be used in scenarios in which the person's activities are to be kept secret or confidential. Accordingly, cryptography may be employed to protect information communicated within system 100. For example, information communicated between the camera 108 and the computing system 112 may be encrypted in accordance with a chaotic, random or pseudo-random number sequence generation algorithm. Such cryptographic algorithms are well known in the art, and will not be described herein. Any known or to be known cryptographic algorithm can be used herein without limitation. In all scenarios, the seed value of the algorithm can include, but is not limited to, the camera's unique identifier, the person's unique identifier, a unique identifier of a given location (e.g., a facility, secured area or zone the person was in, is currently in, or is traveling towards), a unique identifier of a correct path, and/or a unique identifier of a task (or mission) that was, is being or is to be performed by the person. Notably, all or a portion of the data processing that is performed by system 100 can be done using plaintext data and/or encrypted data depending on a particular application.

Figure 2:
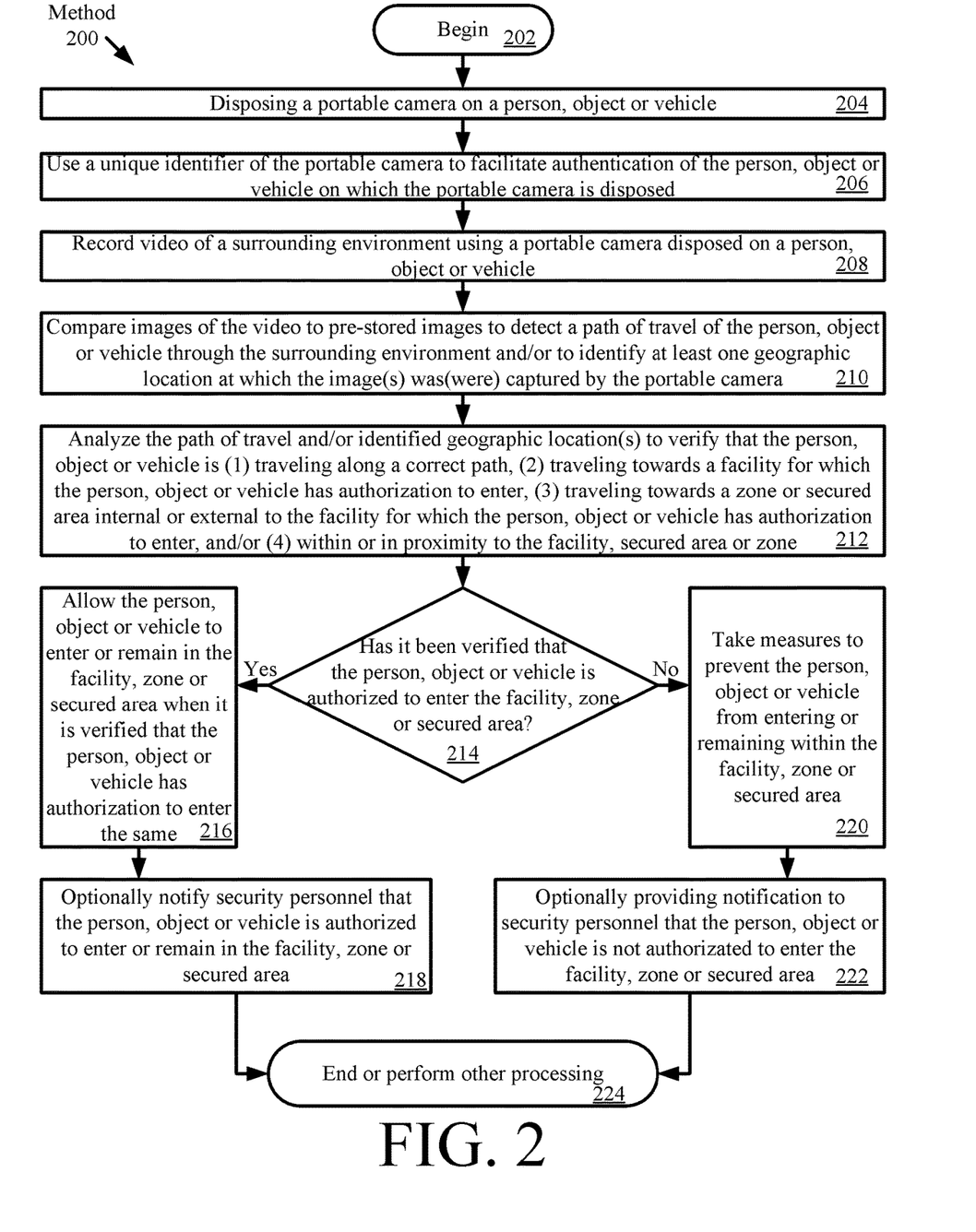
FIG. 2 is a flow diagram of an exemplary method for locating and/or tracking a person, object or vehicle.

Referring now to FIG. 2, there is provided a flow diagram of an exemplary method 200 for location identification and tracking of persons, object and/or vehicles. Method 200 begins with step 202 and continues with step 204 where a portable camera (e.g., portable camera 108 of FIG. 1) is disposed on a person (e.g., person 106 of FIG. 1), object or vehicle.

A unique identifier of the portable camera is used in step 206 to facilitate authentication of the person, object or vehicle on which the camera is disposed. The unique identifier can include, but is not limited to, a sequence of numbers, a sequence of letters, a sequence of letters and numbers, and/or a sequence of other symbols. The unique identifier can be compared to a plurality of unique identifiers stored in a data store for authentication purposes. For example, the person's authentication is at least partially obtained if the unique identifier acquired from the camera matches a unique identifier stored in the data store.

In some scenarios, information other than or in addition to the camera's unique identifier is used for authentication purposes in step 206. This information can include, but is limited to, a user name and/or password associated with the person.

Thereafter in step 208, the portable camera performs operations to record video of a surrounding environment. The video comprises a plurality of video images. The video images are compared to pre-stored images in step 210 (*a*) to detect a path of travel of the person, object or vehicle through the surrounding environment and/or (b) to identify at least one geographic location at which the image(s) was(were) captured. Image processing is well known in the art. Any known or to be known image processing technique can be used herein without limitation.

In some scenarios, the image processing generally involves: comparing a captured image with pre-stored images to identify which one of the pre-stored images contains some or all of the first captured image's content; and obtaining location information stored in a data store so as to be associated with the identified pre-stored image. These image processing steps are iteratively or simultaneously performed for all or some of the captured images. Thereafter, the location information may be used to define a path of travel for the person, object or vehicle. Once the path of travel is defined, the path may be plotted on a multi-dimensional map. The multi-dimensional map may be displayed to relevant persons (e.g., security guards). The path of travel may also be stored for later use as historical travel information for the person, object or person.

The path of travel and/or identified geographic location(s) is(are) analyzed in step 212 to verify that the person, object or vehicle is (1) traveling along a correct path, (2) traveling towards a facility for which the person, object or vehicle has authorization to enter, and/or (3) traveling towards a zone or secured area internal or external to the facility for which the person, object or vehicle has authorization to enter, and/or (4) is located within or in proximity to a facility, secured area or zone for which the person, object or vehicle has authorization to enter. The path of travel and/or identified geographic location(s) additionally or alternatively be analyzed to determine: if the correct path is being traveled or was followed; and/or if the correct path is being traveled or was followed in a prescribed timely manner.

The analysis of step 212 can involve: using a unique identifier of the portable camera to determine an access or clearance level of the person, object or vehicle; and/or using at least one of GPS data, inertial navigation data, beacon data and sensor data in conjunction with the video to verify that the identified geographic location(s) and/or path of travel is(are) correct. In some scenarios, items (1), (2) and/or (3) is(are) verified by (A) comparing the identified geographic location(s) to pre-defined geographic location(s) stored in a data store and/or (B) comparing the detected path of travel to at least one pre-defined path of travel stored in the data store. Additionally or alternatively, a destination of the person/vehicle/object is predicted based on the identified geographic location(s), detected path of travel, the direction of travel, and/or historical travel information associated with the person/vehicle/object. The predicted destination is then compared to a plurality of destinations stored in a data store.

As should be readily understood, GPS data specifies a position of the camera at a specified time as determined by a global navigation satellite. Inertial navigation data specifies the position, orientation and velocity (direction and speed of movement) of the moving camera which were determined using a dead reckoning technique. The inertial navigation data is obtained using a processor, motion sensors (e.g., accelerometers) and rotation sensors (e.g., gyroscopes). Beacon data includes, but is not limited to, unique beacon identifiers which can be used to obtain known locations of the beacons (e.g., iBeacons®). The sensor data can include, but is not limited to, beam break sensor data indicating detected motion of the person to which the camera is attached. iBeacons® and beam break sensors are well known in the art, and therefore will not be described herein. Any known or to be known iBeacon® and/or beam break sensor can be used herein without limitation.

The person, object or vehicle is allowed to enter or remain in the facility, zone or secured area when it is verified that the person, object or vehicle has authorization to enter the same, as shown by steps 214-216. In this regard, a door lock may be commanded to unlock so that the person, object or vehicle can enter the facility (e.g., facility 102 or 104 of FIG. 1) or secured area (e.g., secured area 110 of FIG. 1). The unique identifier of the portable camera can be used to generate the door lock command so as to facilitate keyless access control into the facility or secured area. Additionally or alternatively, the portable camera may be used to capture on image of a mirror reflection of the person, object or vehicle to facilitate access control.

In optional step 218, security personnel are notified that the person, object or vehicle is authorized to enter or remain in the facility, zone or secured area. Such notification can be electronically provided by wirelessly communicating a notification message to a communication device in the possession of the security personnel. The communication device can include, but is not limited to, a personal computer, a smart phone, a portable computer, a personal digital assistant, and/or a smart watch. Additionally or alternatively, an auditory, visual and/or tactile alarm may be output from the communication device of the security personnel and/or another computing device (e.g., a security system in proximity to the security personnel) in addition to and/or in response to the notification message's reception. Subsequently, step 224 is performed where method 200 ends or other processing is performed.

When it is not verified that the person, object or vehicle has authorization to enter the facility, zone or secured area, steps 220-222 are performed. These steps involve: taking measures to prevent the person, object or vehicle from entering or remaining in the facility, zone or secured area; and optionally providing notification to security personnel. In some scenarios, the measures comprise locking a door lock. The unique identifier of the portable camera may be used as an electronic key for locking the door lock. The notification can be electronically provided by wirelessly communicating a notification message to a communication device in the possession of the security personnel. The communication device can include, but is not limited to, a personal computer, a smart phone, a portable computer, a personal digital assistant, and/or a smart watch. Additionally or alternatively, an auditory, visual and/or tactile alarm may be output from the communication device of the security personnel and/or another computing device (e.g., a security system in proximity to the security personnel) in addition to and/or in response to the notification message's reception. Upon completing step 220 or 222, step 224 is performed where method 200 ends or other processing is performed.

In view of the forgoing, the systems and methods described herein have many novel features. For example, the systems: use any standard camera mounted on a person, vehicle or object to facilitate locating and/or tracking movement thereof; continually compare active images to a stored map to determine where in the map the moving object is located; perform exception handling on any image that does not fit into its stored mapping; use known visual or Infrared ("IR") markers to determine an immediate location of the person, vehicle or object (note: this could be used to resync position or to use limited capability hardware which might be required by cheap systems); integrate location into a coordinate system using changes in image to indicate relative distance; store an image with the map for future reference or comparison; augment position or motion data with additional sensors; use a 3D data collection to provide additional detailed mapping information; and define security zones within the mapped area to provide conditional access or alarming.

Figure 3:
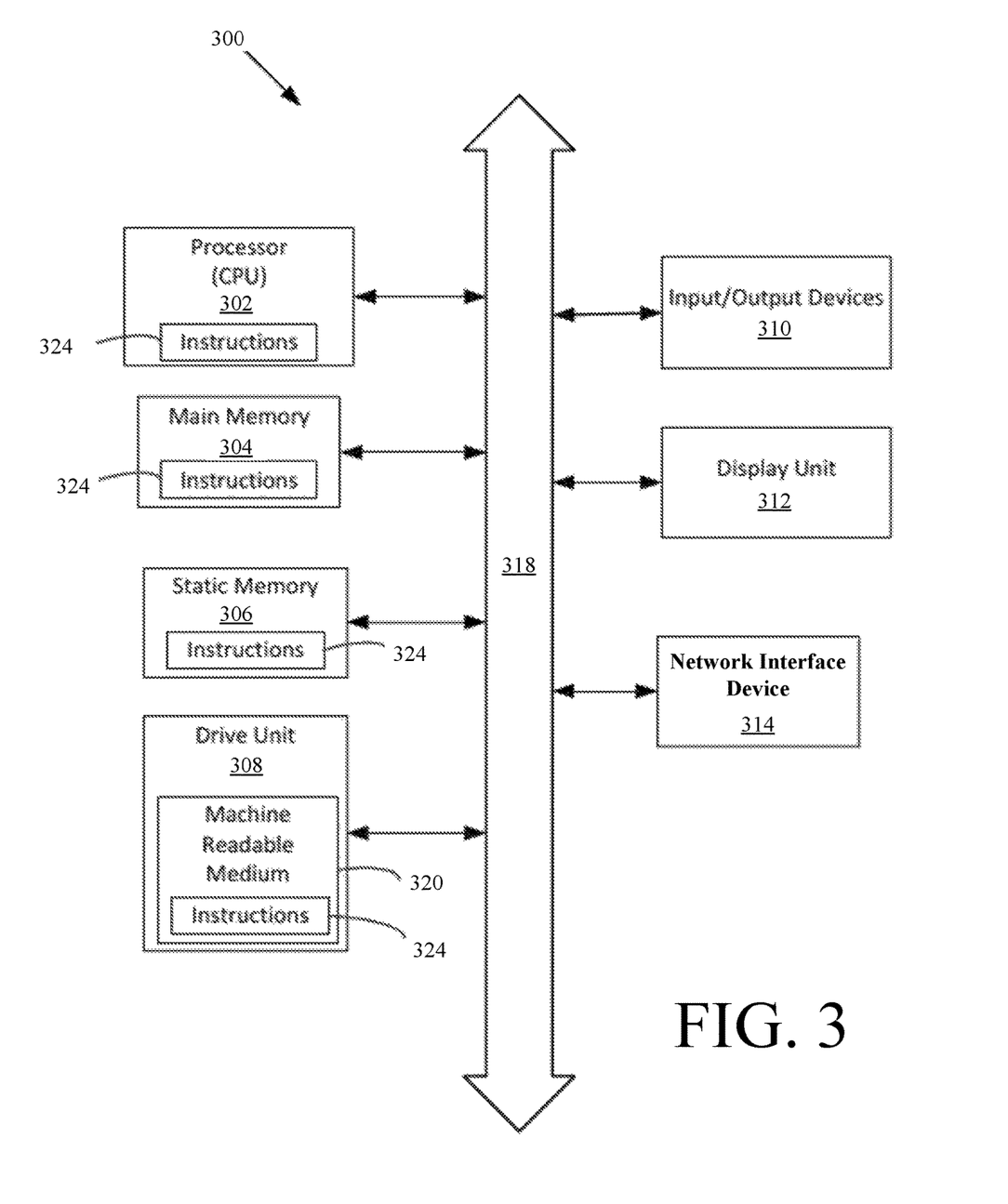
FIG. 3 provides an illustration of an exemplary computing device that can be used to implement the present solution.

Referring now to FIG. 3, there is shown a hardware block diagram comprising an exemplary computer system 300. The machine can include a set of instructions which are used to cause the computer system to perform any one or more of the methodologies discussed herein. In a networked deployment, the machine can function as a server or a router. In one or more scenarios, the exemplary computer system 300 can correspond to the computing system 112 of FIG. 1 and/or the computing elements of camera 108 of FIG. 1. In the camera scenarios, system 300 would include imaging components in addition to the computing elements shown in FIG. 3. The imaging component can include, but are not limited to, an image capturing device. Image capturing devices are well known in the art, and therefore will not be described herein. Any known or to be known image capturing device can be used herein without limitation.

The computer system 300 can operate independently as a standalone device. However, the present solution is not limited in this regard and in other scenarios the computer system can be operatively connected (networked) to other machines in a distributed environment to facilitate certain operations described herein. Accordingly, while only a single machine is illustrated in FIG. 3, it should be understood that the present solution can be taken to involve any collection of machines that individually or jointly execute one or more sets of instructions as described herein.

The computer system 300 is comprised of a processor 302 (e.g., a Central Processing Unit ("CPU")), a main memory 304, a static memory 306, a drive unit 308 for mass data storage and comprised of machine readable media 320, input/output devices 310, a display unit 312 (e.g., a Liquid Crystal Display ("LCD"), a solid state display, or a Cathode Ray Tube ("CRT")), and a network interface device 314. Communications among these various components can be facilitated by means of a data bus 318. One or more sets of instructions 324 can be stored completely or partially in one or more of the main memory 304, static memory 306, and drive unit 308. The instructions can also reside within the processor 302 during execution thereof by the computer system. The input/output devices 310 can include a keyboard, a keypad, a mouse, buttons, a multi-touch surface (e.g., a touchscreen), a speaker, a microphone, an imaging capturing device, and so on. The network interface device 314 can be comprised of hardware components and software or firmware to facilitate wired or wireless network data communications in accordance with a network communication protocol utilized by a data network (e.g., a Local Area Network ("LAN") and/or a Wide Area Network ("WAN")).

The drive unit 308 can comprise a machine readable medium 320 on which is stored one or more sets of instructions 324 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, Electrically Erasable Programmable Read-Only Memory ("EEPROM")) and flash memory devices. A tangible medium as described herein is one that is non-transitory insofar as it does not involve a propagating signal.

Computer system 300 should be understood to be one possible example of a computer system which can be used in connection with the various implementations. However, the present solution is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various implementations broadly include a variety of electronic and computer systems. Some implementations may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that the present solution can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed solutions.

We claim:

1. A computer-implemented method to verify a path of a person, comprising:
    obtaining, by a camera coupled to the person, a plurality of images at each of a series of locations over time;
    for each obtained image, determining, by one or more computing devices, a location of the camera at a time of each obtained image based on detection of one or more known targets in the plurality of each obtained image;
    determining, by the one or more computing devices, a path of the camera over time based on determined locations;
    comparing, by the one or more computing devices, the determined path to a known path;
    for a comparison indicating similarity between the determined path and the known path meeting a predetermined threshold, reporting, by the one or more computing devices, conformance of the person to the known path; and
    for a comparison indicating similarity between the determined path and the known path not meeting the predetermined threshold, reporting, by the one or more computing devices, non-conformance of the person to the known path.

2. The method of claim 1, wherein the one or more known targets include one or more of: symbols, signs, markers, statues, trees, doorways.

3. The method of claim 1, wherein determining the path is based on at least one of: a predicted facility/secured area/zone to which the person is traveling, historical paths of travel associated with the person, a security/access level of the person, tasks assigned to the person, tasks previously performed by the person, tasks being performed by the person, and/or time of day/week/month/year.

4. The method of claim 1, further comprising performing security control measures based on the comparison.

5. A system, comprising:
    at least one processor; and
    memory, in communication with the processor and storing instructions to verify a path of a person,
    wherein the system is operative, upon execution of the instructions by the at least one processor to:
        obtain, by a camera coupled to the person, a plurality of images at each of a series of locations over time;
        for each obtained image, determine, by one or more computing devices, a location of the camera at a time of each obtained image based on detection of one or more known targets in the plurality of each obtained image;
        determine, by the one or more computing devices, a path of the camera over time based on determined locations;
        compare, by the one or more computing devices, the determined path to a known path;
        for a comparison indicating similarity between the determined path and the known path meeting a predetermined threshold, report, by the one or more computing devices, conformance of the person to the known path; and
        for a comparison indicating similarity between the determined path and the known path not meeting the predetermined threshold, report, by the one or more computing devices, non-conformance of the person to the known path.

6. The system of claim 5, wherein the one or more known targets include one or more of: symbols, signs, markers, statues, trees, doorways.

7. The system of claim 5, wherein determining the path is based on at least one of: a predicted facility/secured area/zone to which the person is traveling, historical paths of travel associated with the person, a security/access level of the person, tasks assigned to the person, tasks previously performed by the person, tasks being performed by the person, and/or time of day/week/month/year.

8. The system of claim 5, the system is further operative, upon execution of the instructions by the at least one processor to perform security control measures based on the comparison.

9. A non-transitory computer-readable medium comprising stored instructions executable by a processor to verify a path of a person, the instructions comprising instructions to:
    obtaining, by a camera coupled to the person, a plurality of images at each of a series of locations over time;
    for each obtained image, determining, by one or more computing devices, a location of the camera at a time of each obtained image based on detection of one or more known targets in the plurality of each obtained image;

determine, by the one or more computing devices, a path of the camera over time based on determined locations;

comparing, by the one or more computing devices, the determined path to a known path;

for a comparison indicating similarity between the determined path and the known path meeting a predetermined threshold, reporting, by the one or more computing devices, conformance of the person to the known path; and for a comparison indicating similarity between the determined path and the known path not meeting the predetermined threshold, reporting, by the one or more computing devices, non-conformance of the person to the known path.

10. The system of claim 9, wherein the one or more known targets include one or more of: symbols, signs, markers, statues, trees, doorways.

11. The system of claim 9, wherein determining the path is based on at least one of: a predicted facility/secured area/zone to which the person is traveling, historical paths of travel associated with the person, a security/access level of the person, tasks assigned to the person, tasks previously performed by the person, tasks being performed by the person, and/or time of day/week/month/year.

12. The system of claim 9, the instructions further comprising instructions to perform security control measures based on the comparison.

* * * * *